US006628433B1

United States Patent
Westcott et al.

(10) Patent No.: US 6,628,433 B1
(45) Date of Patent: Sep. 30, 2003

(54) DOCUMENT SCANNING SYSTEM WITH DOCKABLE PLATEN FLATBED PROVIDING SHEET FED AND PLATEN SCANNING FUNCTIONS

(75) Inventors: Robert M. Westcott, Holley, NY (US); Randall R. Maysick, Churchville, NY (US)

(73) Assignee: Eastman Kodak Company, Rochester, NY (US)

( * ) Notice: Subject to any disclaimer, the term of this patent is extended or adjusted under 35 U.S.C. 154(b) by 489 days.

(21) Appl. No.: 09/618,739

(22) Filed: Jul. 18, 2000

(51) Int. Cl.[7] .......................... H04N 1/04; H04N 1/024; H01L 27/00
(52) U.S. Cl. ................... 358/474; 358/496; 358/473; 250/208.1
(58) Field of Search .................. 358/474, 496, 358/473, 483, 401, 400, 498, 506, 514, 501; 250/208.1, 234, 235, 236

(56) References Cited

U.S. PATENT DOCUMENTS 4,734,760 A * 3/1988 Futaki ........................ 358/514
5,881,351 A    3/1999 Shimotoso et al.
5,889,597 A *  3/1999 Ara et al. .................... 358/473

FOREIGN PATENT DOCUMENTS

DE   298 14 558 U1  8/1998
EP       840494 A2  5/1998

* cited by examiner

*Primary Examiner*—Edward Coles
*Assistant Examiner*—Jason Sherrill
(74) *Attorney, Agent, or Firm*—Nelson Adrian Blish (57) ABSTRACT

A modular scanning system (5) consisting of a first scanning unit (32) and a detachable platen element (10) provides for both sheet fed and platen scanning of documents. The first scanning unit (32) includes all the mechanisms necessary to permit sheet fed scanning of documents using a stationary image forming subsystem (40). The platen element (10) provides a second scanning unit (110) which is capable of accepting a second image forming subsystem (70) from the first scanning unit (32) via a docking interface (16). The second image forming subsystem (70) can perform platen scanning of documents placed on a glass piece (26) of the platen element (10). Since the platen element (10) is detachable, the user has the option to select the platen scanning functionality but with the additional flexibility of selectively mounting or storing the platen element (10).

39 Claims, 8 Drawing Sheets

DOCUMENT SCANNING SYSTEM WITH DOCKABLE PLATEN FLATBED PROVIDING SHEET FED AND PLATEN SCANNING FUNCTIONS

FIELD OF THE INVENTION

This invention is related generally to a modular document scanning system and particularly to a modular scanner supporting both sheet fed and platen scanning of documents. More particularly, the invention relates to a modular scanning system with a detachable platen element for single sheet scanning.

BACKGROUND OF THE INVENTION

Document scanners have become a popular computing accessory both in the home and the office. Essentially, document scanners (or simply "scanners") come in three distinct varieties: sheet fed scanners, platen scanners and combination sheet fed with platen capability scanners. With respect to sheet fed scanners, an image forming subsystem, such as a camera, typically a CCD or "charge couple device" and a lens in combination with an illumination source, scans an image by moving a sheet of paper past the camera, which sits in a stationary position. Individual raster lines are imaged by the camera and then pieced together to create a 2D image representation of the original document. With sheet fed scanners, the camera is basically looking at one sliver of the document many times as the document is moved across a lens. The paper motion supplies one dimension of the document while the width is supplied by the camera. The in-paper travel direction and the width of the document is determined by the optics magnification and the charged couple device (CCD) within the image forming subsystem.

In some cases, the shape of the sheet fed scanners paper path is semi-circular. For example, some scanners have a semi-circular paper path where sheets can be fed from a tray on top and exit beneath (or vice versa). In other cases, the paper path is "straight through."

With a platen scanner, a document is placed face down onto a stationary flat, usually glass surface, of the scanning unit and the image forming subsystem (camera and illumination source) moves underneath the fixed document to perform the scanning operation. In this case, the camera's motion is providing the length while the camera's optics provides the width of the scanned document.

Production scanners vary in speed, function and cost and are often used by businesses for scanning large quantities of documents. For example, scans of several hundred (100) to several hundred thousand (100,000) pages per job are typical for "production" scanners. One type of production scanner attempts to combine the functionality of a sheet fed scanner with that of a platen scanner. Essentially, with such combination production scanners, multiple sheets are fed from a stack past a stationary camera, thus eliminating the need for lifting a lid and placing document sheets face down one at a time. The platen capability is also employed to deal with documents that do not feed from a stack reliably. Production scanners of this type are manufactured as a single unit that combine the platen scanning functions with the sheet moving functions in a single box.

In one common configuration, a dual camera image forming subsystem is used with a paper path extending between the cameras and the scanner adapted to operate in two distinct scanning modes. In a sheet fed or straight-through scanning mode, documents are fed from a stack in between the cameras so that they are imaged on both the top and bottom during the same scanning operation. In a platen scanning mode, one of the cameras can be made to mimic the functionality of a platen scanner by placing a platen element adjacent to it and moving the camera beneath a stationary document placed on the platen. In this way, a stationary camera assumes the role of a platen image forming subsystem. Such combination production scanners are often known as platen scanners with autofeed capability. Essentially, this class of scanning devices utilizes a small paper path in combination with a camera that can operate in both a parked position for the auto-feed with subsequent movement of a document for sheet fed scanning as well as a moving operation for a stationary document during platen scanning.

With prior sheet fed, platen, or combination scanners, the user must select one type in favor of another. For those customers whose primary need is for a sheet fed scanner but who occasionally need the platen utility, they must purchase a combination device or two separate scanners (one sheet fed and one platen). Purchasing both types of scanning devices may be cost prohibitive or impossible and, in either case, impractical for applications where portability is desired. For example, service bureaus require the ability to pick up the scanner and host computer, which is attached to the scanner, in order to transport both systems to the jobsite. After the job is finished, the scanner and computer must be brought back to the service bureau headquarters or to the next jobsite. Thus, portability and the ability to reconfigure and perform multiple scanning functions are critical to people who buy scanners to scan documents as a service.

Other limitations of the prior art scanners are the relatively high cost and large size of the form factor associated with the combination production scanners that combine platen and sheet feeding functions in one unit. Since the form factor must be increased, the cost of manufacture is increased over the single function scanning device. Typically, such combination production scanners only come in one of various classes suitable for scanning a single size or style of document. For example, the platen portion of the combination scanner can be equipped to handle 8½×11 inch or European sized documents (also known as A4) or they can be equipped to handle 11 by 17 inch documents (also known as A3). Thus, the prior art combination production scanners may not be configured to scan the size of documents that the customer desires have scanned.

As such, a relatively low cost scanning device that can handle various paper sizes in a unit having a relative small footprint, and which combines the functionality of a platen scanner with that of a sheet fed scanner would provide numerous advantages.

SUMMARY OF THE INVENTION

The present invention provides a modular scanner with a detachable platen element for either single sheet and/or multiple page scanning which "docks" or attaches to a scanning unit providing sheet fed scanning. With the present invention, the end customer is given the functionality of a platen scanner and the ability to selectively mount or store the platen device. The space associated with the platen element can be saved on the desktop as well as the possibility to purchase the scanner with or without the platen accessory. In addition, the size of the platen element can vary to accommodate various sizes and documents.

Accordingly, disclosed in one embodiment is a scanning subsystem supporting platen and sheet fed scanning of documents. The scanning system comprises a first scanning unit with a first enclosure housing a first set of mechanisms for enabling full sheet fed scanning functions. The first scanning unit also includes a second set of mechanisms for enabling partial platen scanning functions and a docking interface defining an opening in the first enclosure. A second scanning unit with a second enclosure can be attached to the first scanning unit through the docking interface. The second scanning unit includes a third set of mechanisms for enabling complete platen scanning of documents in operable combination with the second set of mechanisms within the first scanning unit.

In one embodiment, the first scanning unit includes a feeder opening through which paper documents can be fed for sheet fed scanning. A first exit opening is provided and adapted to deliver scanned documents from a first location of the first scanning unit. A paper pathway and extends from the feeder opening through the first exit opening. A first image forming subsystem is predisposed within the first scanning unit and configured to scan images appearing on paper documents fed through the feeder opening and transported over the first paper pathway. A feed roller predisposed about the feeder opening facilities the introduction of documents onto the first paper pathway. A separation roller or separation pad can also be employed and used to ensure that only a single sheet of paper is fed through the feeder opening.

The first scanning unit further includes a plurality of rollers predisposed about the first paper pathway for facilitating transmission of paper documents from the feeder opening to either the first exit opening or a second exit opening. The first image forming subsystem can include a lens and a light source predisposed about the paper pathway for directing light onto paper documents entering the first scanning unit through the feeder opening. Mirrors within the first scanning unit are configured for guiding reflected light from the paper document through the lens and onto the CCD. In this way, the first image forming subsystem is able to sheet fed scan a document.

The second set of mechanisms comprise a second image forming subsystem and a drive subsystem for causing said second image forming subsystem to move from a sheet fed scanning position to a pre-platen scanning position. Specifically, motion of the second image forming subsystem along an axis substantially perpendicular to the opening defined by the docking interface is facilitated by the drive subsystem. The drive subsystem can include pulleys and belts which are adapted for engaging the second image forming subsystem and causing its motion along an axis perpendicular to the opening.

In essence, the second image forming subsystem is made to enter the second scanning unit through the opening prior to platen scanning of documents placed on a glass piece attached to the top surface of the second scanning unit. Platen scanning by the second scanning unit occurs as the second image forming subsystem traverses the length of the enclosure of the second scanning unit. In this regard, a Thompson rod can be used to engage a Thompson rod bearing of the second image forming subsystem to guide the motion of the camera and permit it to sweep a document placed on the glass piece during platen scanning. Once the second image forming subsystem traverses the length of the second enclosure associated with the second scanning unit, it can return to an initial pre-scanning position ready for subsequent scanning operations of either the platen scan or sheet fed scanning modality.

According to another embodiment, disclosed is a modular scanner comprising a first enclosure with a stationary camera therein and having a first opening for feeding a document to be scanned, a second opening for delivering a scanned document to a user, and a third opening through which one or more docking mechanisms can join. A first paper pathway extends between the first opening and the second opening within the first enclosure. A document handling means within the first enclosure can receive a document through the first opening and transport it over the first paper pathway to an area within the first enclosure where the stationary camera can scan the document. A light source is predisposed for delivering light energy in the direction of the document with light guiding means adapted for directing reflected light energy from the document to the stationary camera. Also provided is a moveable camera mounted within the first enclosure adjacent to the stationary camera.

The modular scanner can further comprise a second enclosure having a substantially flat top surface with a glass plane thereon and includes an opening at one end adapted for receiving the movable camera when the second enclosure is attached to the first enclosure via the third opening. A first translation means is also provided within the first enclosure for causing the motion of the motion of the moveable camera from a sheet fed scanning mode that places the moveable camera within the opening of the second enclosure. A drive subsystem is also provided within the second enclosure for receiving the moveable camera through the opening and causing the camera to traverse along an axis substantially parallel to the glass plane. Sheet fed and platen scanning of documents are facilitated by the stationary camera and moveable camera, respectively.

Further disclosed is a detachable platen element for a modular scanning system. The platen element includes an enclosure having a top surface with a glass plane attached thereon. The enclosure has one end with an opening for accepting an image-forming subsystem. A translation means is provided within the enclosure and adapted for attachment to the image forming subsystem and causing it to move in a direction permitting scanning of documents placed on the glass plane. The platen element can include a lid with a substantially flat surface suitable for covering documents placed on the glass plane. The lid can be opened and closed with a hinging means that couples the lid to the enclosure. The translation means can include a pulley and belt system adapted to engage the image forming subsystem for facilitating its motion and permitting platen scanning of documents placed on the glass plane. A rod within the enclosure can engage the image forming subsystem and facilitate its movement for platen scanning.

BRIEF DESCRIPTION OF THE DRAWINGS

For a better understanding of the invention, reference is made to the following detailed description taken in conjunction with the appended drawings in which.

Corresponding numerals and references in the detailed description correspond to like parts in the figures unless otherwise indicated.

DETAILED DESCRIPTION OF THE INVENTION

The present invention provides a modular scanner or scanning system with a detachable platen element for single sheet or multiple document scanning which allows for both sheet fed and platen scanning of documents. The platen element attaches or docks to a "straight-through" or sheet fed scanning unit that includes a portion of the mechanisms necessary for platen scanning. With the present invention, a user can have platen functionality by selectively mounting or storing the platen element. In this way, the space associated with the platen element can be saved and the user can purchase the scanner system with or without the platen element as their option. Additionally, the platen element may be purchased in different sizes allowing the end-user to purchase the size scanner desired and nothing larger.

Figure 1A:
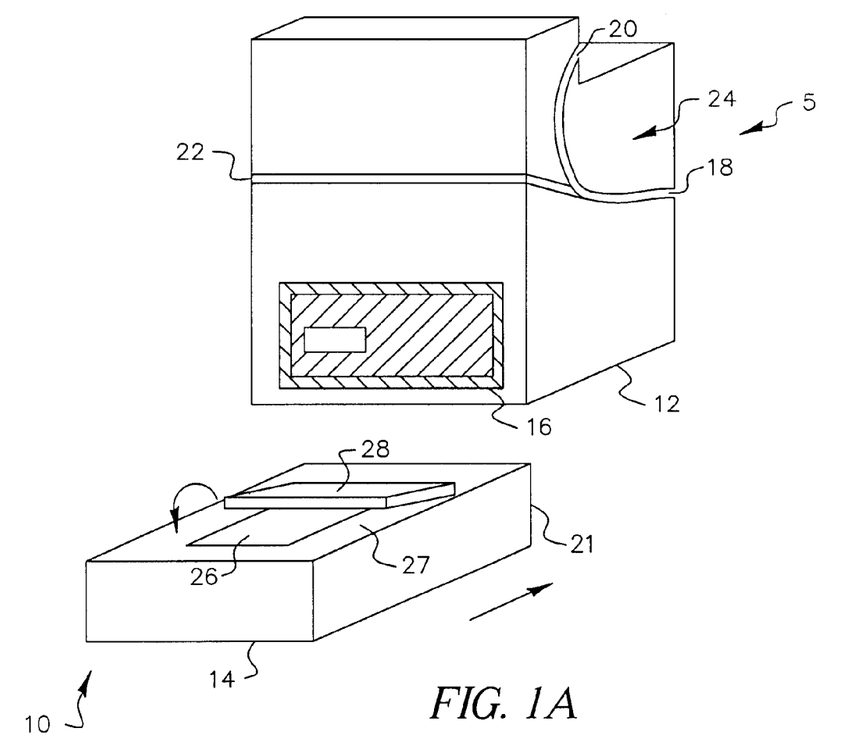
FIGS. 1A and 1B illustrate the scanning system of the present invention with the detachable platen element, according to a preferred embodiment.
Figure 1B:
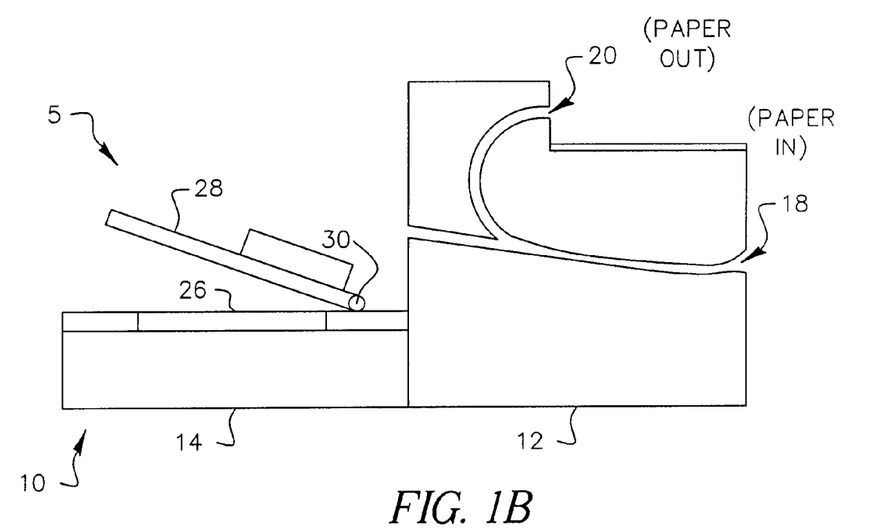

For a better understanding of the invention, reference is made to FIGS. 1A and 1B, which illustrate the modular scanning system 5 of the present invention, according to the preferred embodiment. Scanner system 5 is seen to include a first enclosure 12 which provides a housing for the various components, devices, subsystems, and other mechanisms necessary to effectuate sheet fed scanning of documents fed through a feeder opening 18 into the first enclosure 12. The enclosure 12 includes first and second exit openings 20 and 22, respectively, which provide two means of delivering a scanned document to a user.

Scanning system 5 also includes a platen element 10 which takes the form of a second enclosure 14 that can be selectively attached to the first enclosure 12 to enable the platen scanning functionality as described herein. Specifically, since the platen element 10 is a separate enclosure 14 from the first enclosure 12, it allows a separation of the platen scanning function from the sheet fed scanning function. In this way, the weight, space, and cost associated with prior art combination production scanners that combine sheet fed and platen scanning in a single box (or unit) can be saved with each section of the scanning system 5 being separately purchasable transportable.

The second enclosure 14 houses some of the mechanisms necessary to enable platen scanning. Other platen scanning mechanisms are obtained from the first enclosure 12 of the scanning system 5 after attachment of the platen element 10 to the first enclosure 12. A glass piece 26 is attached to the top surface 27 of the second enclosure 14 and provides a space where documents to be scanned can be placed. A lid 28 allows covering of documents to be scanned to limit the outside influence of lights and other affects which would interfere with proper scanning of a document.

Figure 2A:
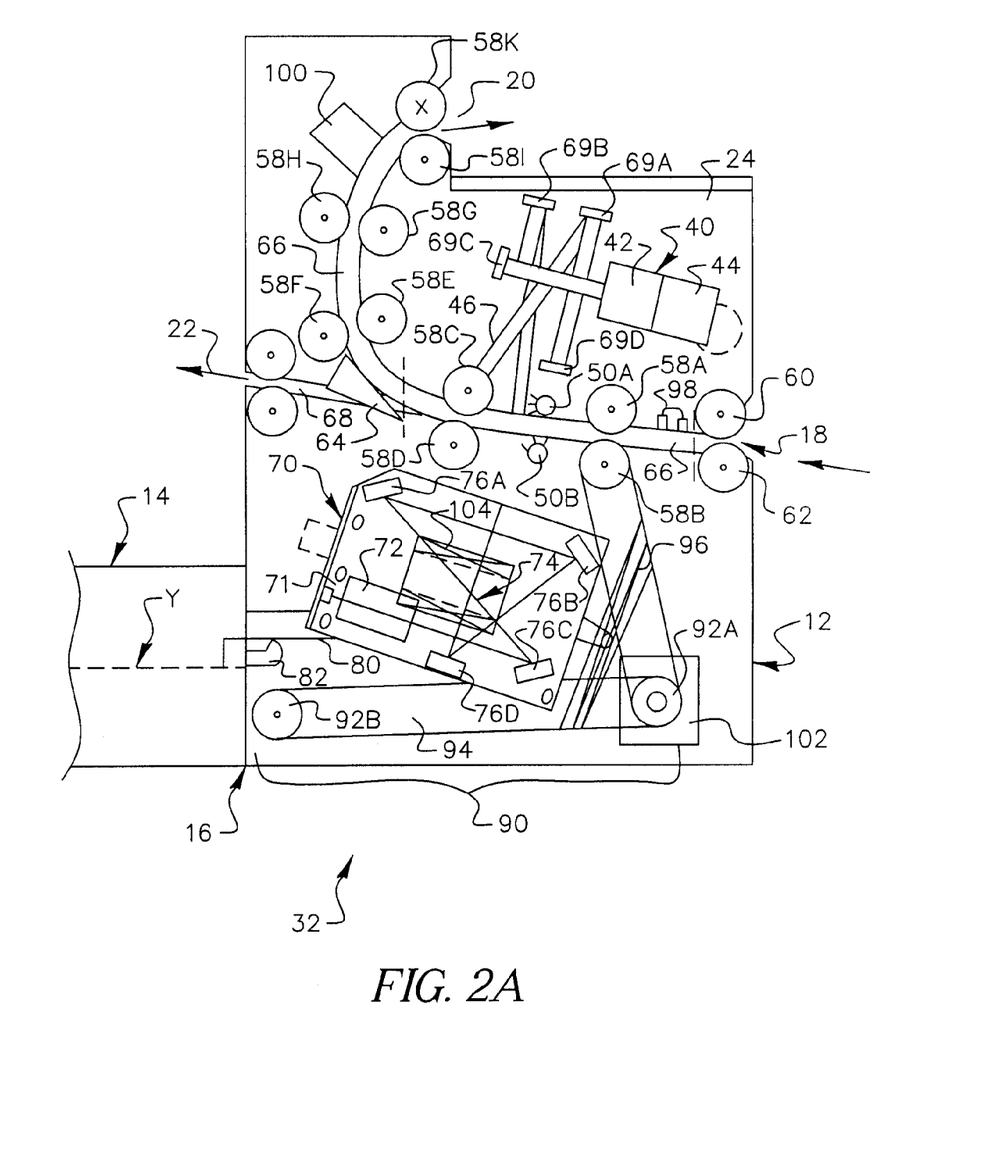
FIGS. 2A and 2C illustrate in detail the internal mechanisms of the first scanning unit of the scanning system of the present invention.

With reference to FIG. 2A, prior to use of the platen element 10, a second image forming subsystem 70 must be displaced from the first enclosure 12 to the second enclosure 14 of the platen element 10. A mounting block 71 supports the second image forming subsystem 70 in place and is operable engaged to a pivoting means 74, the operation of which is described below. The platen element 10 includes an end 21 with an opening (not shown) which provides a means for accepting the second image forming subsystem 70. In operation, a user attaches the end 21 to the docking interface 16 of the first enclosure 12. A hook 82 serves as a docking mechanism that that securely docks the platen element 10 to the first enclosure 12 although other devices capable of serving as a docking mechanism within the platen element 10 and/or the first enclosure 12 may be employed. For example, each enclosure 12, 14 may include separate docking means that latch together once the platen element 10 is attached to the first enclosure 12. As shown, the docking interface 16 defines an opening through which the second image forming subsystem 70 passes from the first enclosure 12 to the second enclosure 14 of the platen element 10. Thus, the first enclosure 12 include a portion of the working mechanisms necessary for platen scanning with the remaining mechanisms housed in the second enclosure 14.

The attachment of the platen element 10 to the enclosure 12 is illustrated in FIG. 1B. In this configuration, a user has the option of sheet fed scanning by the insertion of documents through feeder opening 18 or platen scanning of documents by placement of documents over glass plane 26 of the platen element 10. In other configurations, the platen element 10 can be fitted with an automatic document feeder (not shown) that can place documents automatically on the glass piece 26. An automatic feeder (not shown) can be attached to the enclosure 12 of the scanning system 5 opposite the platen element 10 to enable feeding of documents through the feeder opening 18.

Figure 2B:
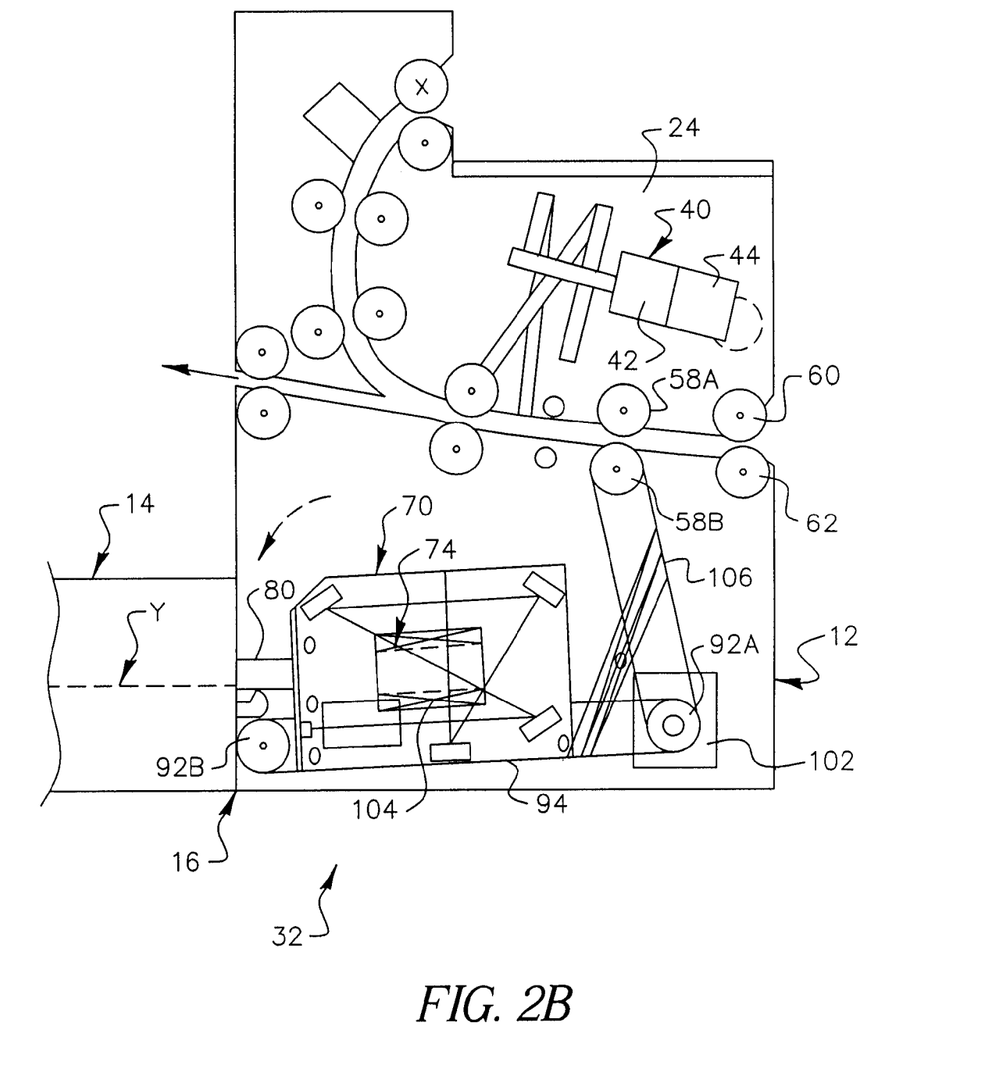
Figure 2C:
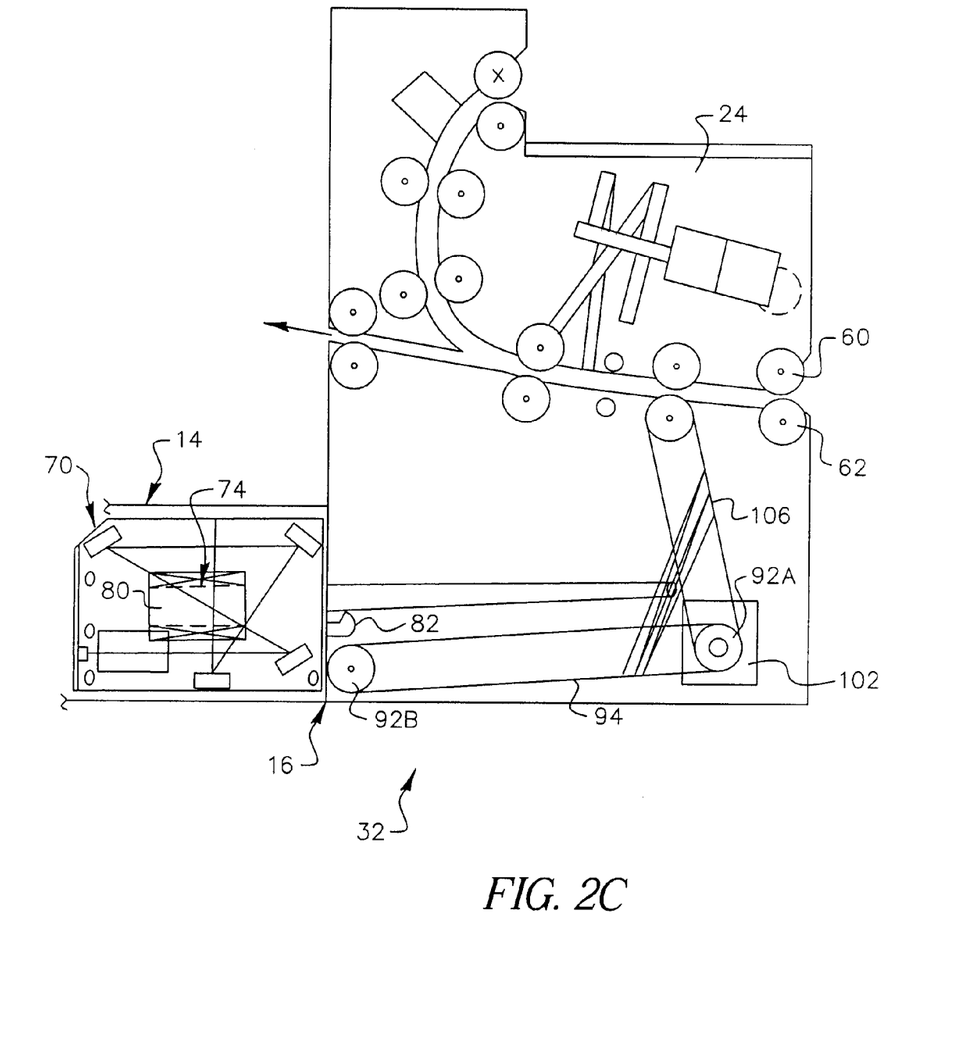

Referring to FIGS. 2A through 2C, therein is shown a first scanning unit, denoted generally as 32, illustrating the various components, devices, subsystems and mechanisms that are included in a modular scanning system such as modular scanning system 5. Specifically, scanning unit 32 includes the mechanisms necessary to achieve full sheet fed scanning of documents fed through feeder opening 18. Additionally, scanning unit 32 includes a second set of mechanisms necessary to achieve partial platen scanning in combination with a third set of mechanisms within the platen element 10.

The first scanning unit 32 is seen to include a pair of rollers 60 and 62 predisposed about the feeder opening 18 and configured to facilitate the transmission of documents onto the first paper pathway 66. The top roller 60, often referred to as a feeder roller, is configured to draw a sheet of paper into the first paper pathway 66 by grabbing a document from the top of a stack and transmitting it through the space between the feeder roller 60 and the separation roller 62. This action is often referred to in the industry as "feed and separation" with the separation roller 62 can also be referred to as a "retardation" or "breaking" roller, as is well known by those of ordinary skill in the art. The separation roller 62 acts to ensure that only a single sheet of paper enters the first paper pathway 66 within the first enclosure 12 of the first scanning unit 32 at any one time.

First and second top rollers 58A and 58C, respectively, work with first and second bottom rollers 58B and 58D, respectively, to transport a document to an area (marked by the dashed lines) where a first image forming subsystem 40 comprising a camera lens 42 can scan the document. First and second light sources 50A and 50B, respectively, provide the light energy necessary to illuminate images on a document which are directed to the lens 42 of the image forming subsystem 40 using light guiding means 69A, 69B, 69C and 69D (hereinafter 69A:69D). Light guiding means 69A:69D are typically mirrors or other similar reflective surfaces predisposed within the enclosure 12 of the first scanning unit 32. In this way, the first image forming subsystem 40 is capable of obtaining a scanned digital representation of images on documents fed through feeder opening 18. Typically, the first image forming subsystem 40 is a stationary unit within the enclosure 12 so that sheet fed scanning of documents is permitted by motion of the document through the feeder path 66.

Following scanning, other rollers 58E:58K within the enclosure 12 transmit the document through opening 20 or alternatively, through opening 22. The number of rollers and their placement or configuration can vary according to design. Essentially, rollers 58A:58K, 60, and 62 in combination with paper pathway 66 provide a document handling means within the first scanning unit 32. The selection of either exit opening 20 or exit opening 22 is facilitated by pivot 64 which, in one embodiment, can be operably coupled to a selector switch (not shown) outside the enclosure 12 which a user can operate. This can also be achieved via a mode setup through the host computer (not shown) attached to the scanner and some combination of a solenoid and linkage sensing switch. By providing two separate exit openings, 20 and 22, documents can exit the first scanning unit 32 either in a face-down orientation or face-up orientation, respectively, compared to the orientation of the document entering through feeder opening 18. As is well known in the art, the use of exit opening 22 is often referred to as straight-through document feeding. The straight-through approach could also be configured in a manner where sheets are fed from the bottom of a stack thereby allowing document order to be maintained.

Figure 4A:
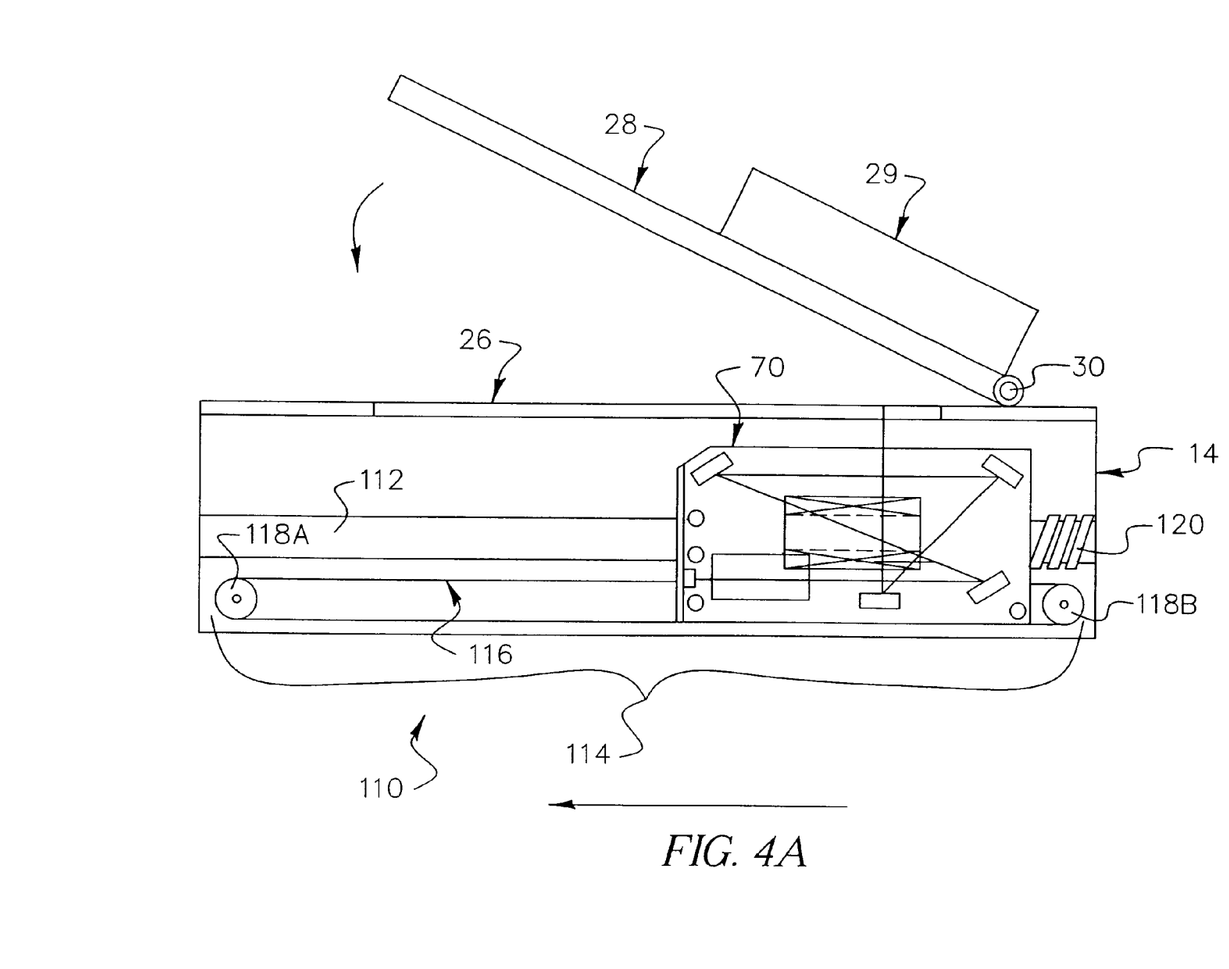
FIGS. 4A through 4C illustrate the process of platen scanning using the detachable platen element of the present invention, according to a preferred embodiment.

The first scanning unit 32 is seen to include a second image forming subsystem 70 which provides a mechanism for enabling platen scanning in connection with certain mechanisms within the second scanning unit 110 shown in FIG. 4A. The second image forming subsystem 70 includes, among other components well known in the art, a lens 72 and mirrors 76A, 76B, 76C and 76D which scan a document during platen scanning. As shown in FIG. 2A, the second image forming subsystem 70 is stored in a non-scanning position within the enclosure 12 of the first scanning unit 32 when not in use. In another embodiment, the second image forming subsystem 70 is used for double sided scanning within the first scanning unit 32 in operation with the first image forming subsystem 40.

A pivot 104 allows translation of the mounting plate 71 supporting the second image forming subsystem 70 to the position shown in FIG. 2B. In this position, the second image forming subsystem 70 is predisposed for entering the second enclosure 14 of the platen element 10 through the opening defined by the docking interface 16. A rod bearing 74 (or Thompson rod bearing) within the housing of the second image forming subsystem 70 is provided and adapted for engaging rod 80 (or Thompson rod) for facilitating the motion of the second image forming subsystem 70 in a direction parallel to axis Y. A first drive subsystem 90, or other suitable translation means, comprises pulleys 92A, 92B, and belt 94, can be used for translating the second image forming subsystem 70 in the direction of docking interface 16 to allow the displacement of second image forming 70 from the first scanning unit 32 to the second enclosure 14 of platen element 10. In this way, the second image forming subsystem 70 glides along rod 80 extending into the second enclosure 14 of the platen element 10 and assumes a pre-platen scanning position as shown in FIG. 2C. The second image forming subsystem 70 is then ready to perform platen scanning of documents placed on a glass piece 26 of platen element 10 with the second image forming subsystem 70 is entirely within the second enclosure 14.

Figure 3:
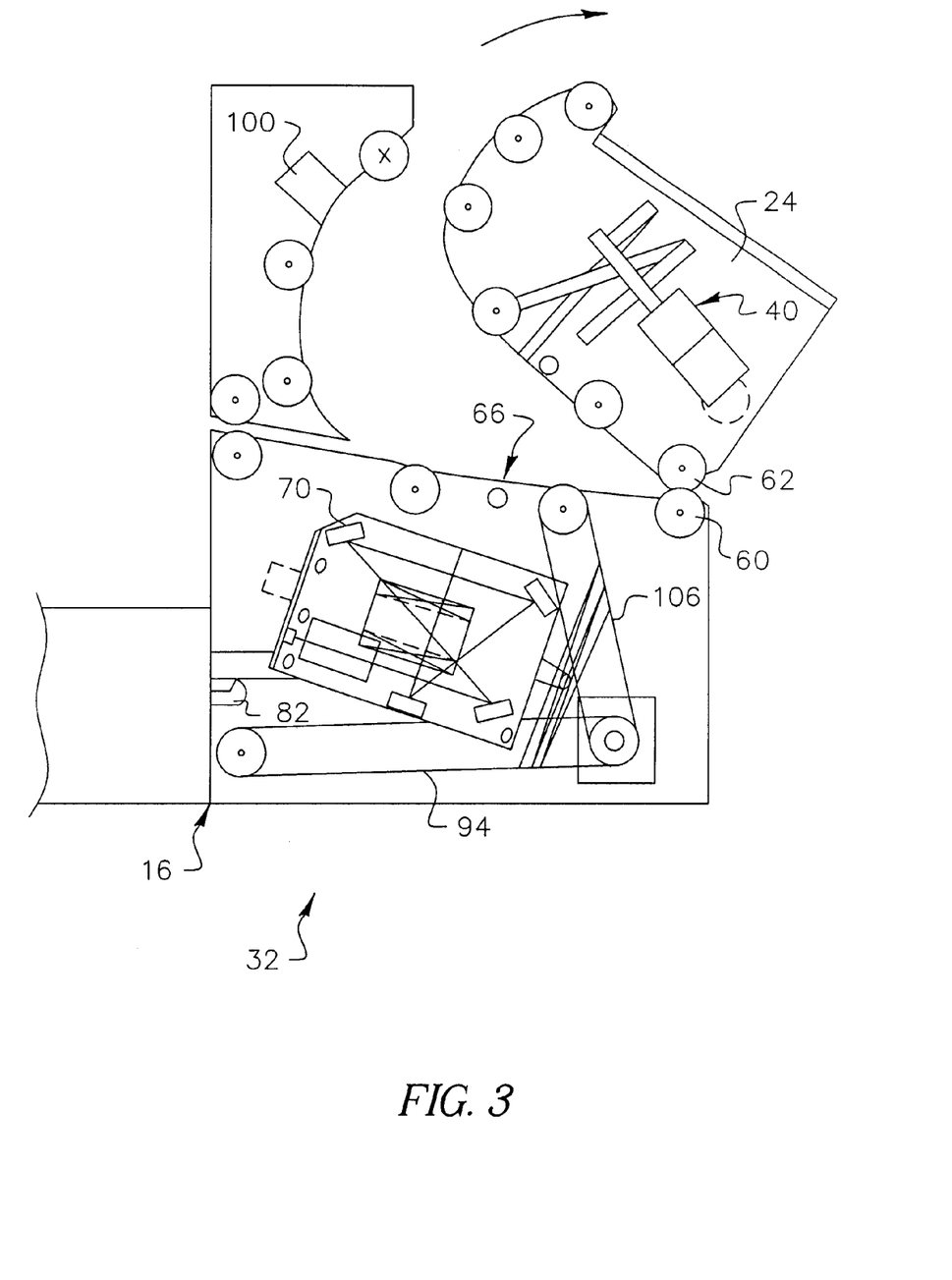
FIG. 3 illustrates the hatch opening feature of the scanning system of the present invention, according to one embodiment.

The scanning system 5 of the present invention can include other features and functions found in prior art scanning equipment and well known to those of ordinary skill in the art. For example, FIG. 3 illustrates removal of the hatch 24 of the first scanning unit 32 in order to clear paper and/or other debris that may be stuck within the first paper pathway 66. The hatch 24 is therefore provided with a hinging means (not shown) that allows it to create an opening for clearing paper jams by a user. An inkjet 100 can be provided to facilitate storage of ink for printing and identifying numbers or codes by a user. A double document sensor 98 is used to sense the presence of more than a single sheet of paper that may inadvertently enter the feeder opening 18. Other features and options can be provided as is understood by those of ordinary skill in the art.

Figure 4B:
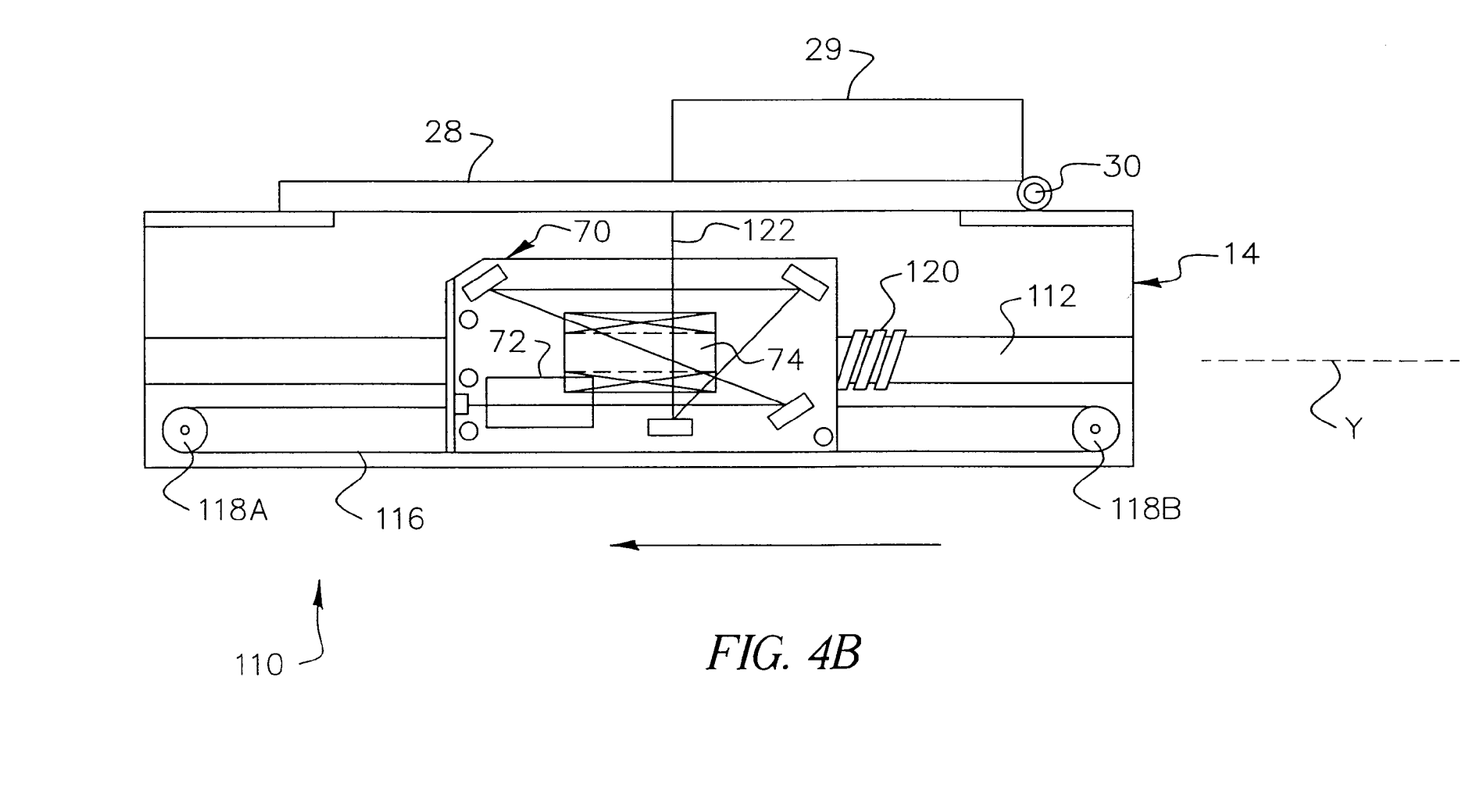
Figure 4C:
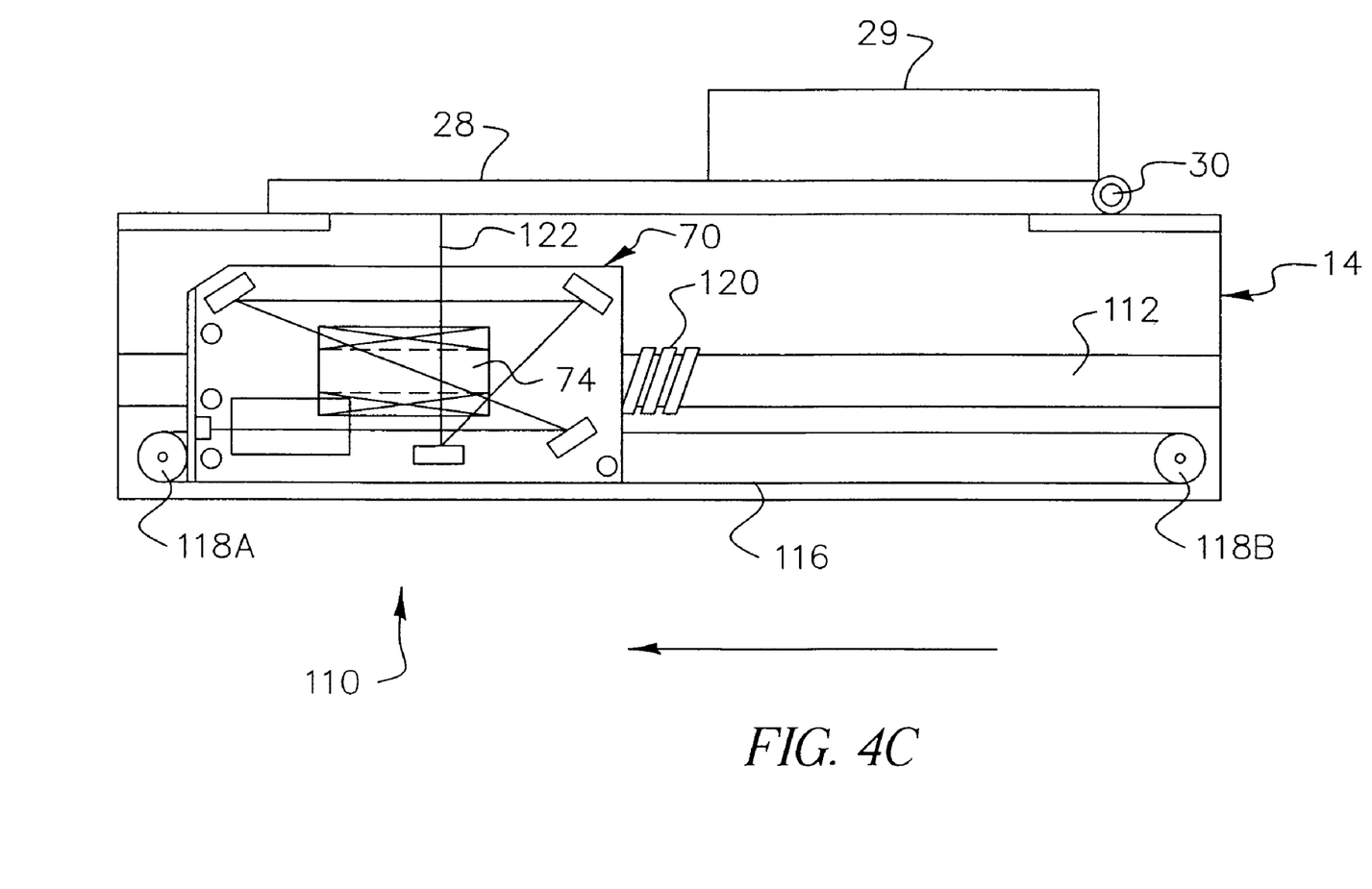

With reference to FIGS. 4A through 4C, a detailed functional diagram of a second scanning unit 110 including the subsystems, components and other mechanisms suitable for implementing the functions of a platen element, such as platen element 10, are shown. Specifically, the second image forming subsystem 70 is operably engaged with rod 112 within the enclosure 14 of the second scanning unit 110. A second drive subsystem 114 (or other suitable translation means) facilitates the motion of second image forming subsystem 70 during platen scanning of documents placed on glass piece 26. In one embodiment, second drive subsystem 114 comprises pulleys 118A, 118B and belt 116 facilitate motion of the second image forming subsystem 70 within enclosure 14. A motion spring 120 can be used to provide the recoil tension for returning the second image forming subsystem 70 to a ready-to-scan position as shown in FIG. 4A.

In FIG. 4B, the second image forming subsystem 70 has started traversing along an axis substantially parallel to axis Y. Prior to platen scanning, the lid 28 can be closed in order to provide the proper lighting, background, and paper constraint conditions for the second image forming subsystem 70 and, in particular, to permit lens 72 to receive adequate light reflections of images appearing on documents placed on glass piece 26. A hinge 30 or other similar hinging means couples the lid 28 to the top surface 27 of the enclosure 14. Also, a paper tray 29 may be provided on the lid 28 as a way of holding paper or other documents for increasing the convenience of the user. The paper tray 29 accepts documents being fed through the sheet fed scanner. Paper tray 29 is commonly referred to in the industry as an "output" or "exit" tray. In FIG. 4C, the second image forming subsystem has completed a platen scanning function and is ready for returning to a ready-to-scan position within the enclosure 14.

Accordingly, the present invention provides a scanning system consisting of first and second scanning units that provide for both sheet fed and platen scanning of documents. Specifically, a first scanning unit 32 includes all the mechanisms necessary to permit sheet fed scanning of documents using a fixed, stationary image forming subsystem 40. A second scanning unit 110 includes a means of accepting a second image forming subsystem 70 and causing its motion in order to perform platen scanning of documents placed on the platen element 10. The end result is a modular scanning system 5 with a detachable platen element that allows the customer to have platen scanning functionality but with the additional flexibility of selectively mounting or storing the platen element 10. In addition, the scanning system 5 of the present invention permits the user to purchase a scanner with or without the platen element 10 as an accessory. The platen element 10 can accommodate different size documents and form factors and can be purchased separately based on the needs of the user.

While the invention has been described with reference to specific and preferred embodiments, it should be understood that aspects of the invention may have application in other context and that variations and modifications to the present invention may become apparent to those of ordinary skill in the art. It is, therefore, contemplated that such variations and modifications be encompassed within the scope of the invention and the following claims.

PARTS LIST

5. Scanning system
10. Platen element
12. First enclosure
14. Second enclosure
16. Docking interface
18. Feeder opening
20. First exit opening
21. End
22. Second exit opening
24. Hatch
26. Glass piece
27. Top surface
28. Lid
29. Paper tray
30. Hinge
32. First scanning unit
40. First image forming subsystem
42. Lens
44. Charged couple device
46. Reflected light
50a. First lamp
50b. Second lamp
58a. First top roller
58b. First bottom roller
58c. Second top roller
58d. Second bottom roller
58e:58k. Rollers
60. Feeder roller
62. Separation roller
64. Pivot
66. First paper pathway
68. Second paper pathway
69a. First mirror
69b. Second mirror
69c. Third mirror
69d. Fourth mirror
70. Second image forming subsystem
71. Mounting plate
72. Lens
74. Rod bearing
76a. First mirror
76b. Second mirror
76c. Third mirror
76d. Fourth mirror
80. Rod
82. Lock
90. First drive subsystem
92a. First pulley
92b. Second pulley
94. Belt
96. Ribbon cable
98. Double document sensor
100. Inkjet
102. Motor
104. Pivot
106. Belt
110. Scanning unit
112. Rod
114. Second drive subsystem
116. Belt
118a. Third pulley
118b. Fourth pulley
120. Motion spring
122. Reflected light

What is claimed is:

1. A scanning system supporting platen and sheet fed scanning of documents comprising:

a first scanning unit with a first enclosure housing a first set of mechanisms for enabling full sheet fed scanning functions and a second set of mechanisms for enabling partial platen scanning functions, said first scanning unit further comprising a docking interface defining an opening of said first enclosure; and a second scanning unit with a second enclosure capable of attachment to said first scanning unit through said docking interface and including a third set of mechanisms for enabling complete platen scanning of documents in operable combination with said second set of mechanisms.

2. The scanning system of claim 1 wherein said first set of mechanisms of said first scanning unit comprise:

a feeder opening through which paper documents can be fed into said first scanning unit;

a first exit opening adapted to output scanned documents from a first location of said first scanning unit;

a first paper pathway extending from said feeder opening to said first exit opening; and a first image forming subsystem predisposed within said first scanning unit for scanning images appearing on paper documents fed through said feeder opening.

3. The scanning system of claim 2 further comprising a feed roller predisposed about said feeder opening and adapted to facilitate the introduction of said documents unto said first paper pathway.

4. The scanning system of claim 3 further comprising a separation roller predisposed adjacent to said feed roller and adapted to ensure that only a single sheet of paper is fed through said feeder opening during at any one time.

5. The scanning system of claim 2 further comprising a plurality of rollers predisposed about said first paper pathway and configured for facilitating the transmission of paper documents from said feeder opening to said first exit opening.

6. The scanning system of claim 2 wherein said first camera sub-assembly comprises:

a lens;

a light source predisposed about said first paper pathway for directing light into paper documents entering said first scanning unit through said feeder opening; and reflection means predisposed for guiding reflected light from said paper documents to said lens.

7. The scanning system of claim 6 wherein said reflection means comprises mirrors.

8. The scanning system of claim 1 wherein said second set of mechanisms comprise:

a second image forming subsystem; and a drive subsystem for engaging said second image forming subsystem and moving it from a non-scanning position to a pre-scanning position.

9. The scanning system of claim 8 further comprising pivoting means operably coupled to said motor for facilitating the motion of said second image forming subsystem from said non-scanning position to said pre-scanning position.

10. The scanning system of claim 9 wherein said first drive subsystem is further configured to move said second image forming subsystem along an axis substantially perpendicular to said opening defined by said docking interface.

11. The scanning system of claim 10 wherein said first drive subsystem further comprises:
pulleys predisposed along the length of said axis;
a belt coupled to said second image forming subsystem and engaged with said pulleys for moving said second image forming subsystem towards said opening defined by said docking interface; and
drive means for causing said belt to rotate about said pulleys.

12. The scanning system of claim 8 wherein said second scanning unit further comprises:
an opening within said second enclosure adapted to accept said second image forming subsystem through said opening defined by said docking interface when said second scanning unit is attached to said first scanning unit; and
a second drive subsystem for facilitating the motion of said second image forming subsystem within said second enclosure along an axis substantially perpendicular to said opening of said second enclosure.

13. The scanning system of claim 8 wherein said second drive subsystem further comprises:
pulleys predisposed along the length of said axis;
a belt which can be engaged with said second image forming subsystem for translating said second image forming subsystem within said second enclosure, said belt operably coupled with said pulleys for moving said second image forming subsystem within said second enclosure; and
drive means for causing said belt to rotate about said pulleys.

14. The scanning system of claim 13 wherein said second image forming subsystem further comprises a rod bearing.

15. The scanning system of claim 14 further comprising a rod predisposed within said second enclosure of said second scanning unit for engaging said second image forming subsystem via said rod bearing and to permit the translation of said second image forming subsystem within said second enclosure along an axis substantially perpendicular to said opening of said second enclosure.

16. The scanning system of claim 1 wherein said second enclosure of said second scanning unit further comprises a substantially flat upper surface.

17. The scanning system of claim 16 wherein further comprising a glass plane fixed to said upper surface and providing a platform upon which documents can be placed.

18. The scanning system of claim 17 further comprising:
a lid for covering documents placed on said glass plane; and
a hinging means coupling one end of said lid.

19. The scanning system of claim 2 wherein said first paper pathway is configured to accept documents through said feeder opening so that said documents are in a face-up orientation and to deliver scanned documents out through said first exit opening with said documents in a face-down orientation.

20. The scanning system of claim 2 further comprising:
a second exit opening adapted to output scanned documents from a second location of said first scanning unit; and
a second paper pathway extending from said feeder opening to said second exit opening.

21. The scanning system of claim 20 wherein a portion of said second paper pathway is common to said first paper pathway.

22. The scanning system of claim 20 wherein said second paper pathway is configured to accept documents through said feeder opening so that said documents are in a face-up orientation and to deliver scanned documents out through said second exit opening with said documents in a face-up orientation.

23. A modular scanner comprising:
a first enclosure with a stationary camera therein, said first enclosure having a first opening for feeding a document to be scanned, a second opening for delivering a scanned document to a user, and a third opening through which one or more docking mechanisms can join;
a first pathway extending between said first opening and said second opening within said first enclosure;
document handling means within said first enclosure adapted for receiving a document through said first opening and transporting said document via said first paper pathway to an area within said first enclosure where said stationary camera can scan said document;
a light source for delivering light energy in the direction of said document;
a light guiding means for direction reflected light energy from said document to said stationary camera;
a moveable camera mounted within said first enclosure adjacent to said stationary camera;
a second enclosure having a substantially flat top surface with a glass plane thereon, said second enclosure having an opening at one end adapted for receiving said moveable camera when said second enclosure is attached to said first enclosure via said third opening;
first translation means within said first enclosure for causing said movable camera to move from a sheet fed scanning mode to a platen scanning mode that places said moveable camera within said opening of said second enclosure;
second translation means within said second enclosure for receiving said moveable camera through said opening and causing said camera to traverse along an axis substantially parallel to said glass plane; and
wherein said stationary camera is further adapted to facilitate sheet fed scanning of documents fed through said first opening and said moveable camera is further adapted to facilitate platen scanning of documents placed on said galls plane.

24. The modular scanner of claim 23 further comprising pivoting means for maintaining said moveable camera in a stationary position within said first enclosure when said moveable camera is in said sheet fed scanning mode.

25. The modular scanner of claim 23 further comprising a mounting block supporting said moveable camera within said first closure while in sheet fed scanning mode.

26. The modular scanner of claim 25 wherein said mounting block includes a rod bearing and wherein said second enclosure further comprises a rod configured to engage said rod bearing for facilitating the movement of said moveable camera within said second enclosure.

27. The modular scanner of claim 23 wherein said first translation means comprises a pulley and belt system operably coupled to said second camera for facilitating its transition from said sheet fed scanning mode to said pre-platen scanning mode.

28. The modular scanner of claim 23 wherein said light guiding means comprises mirrors within said first enclosure adapted to direct light energy to a lens of said stationary camera.

29. The modular scanner of claim 23 further comprising:
a lid for covering documents placed on said glass plane; and
hinging means coupling said door to lid.

30. The modular scanner of claim 23 wherein said second translation means comprises a pulley and belt system adapted to engage said second camera when placed in said second enclosure for facilitating platen scanning of documents placed on said glass plane.

31. The modular scanner of claim 23 wherein said first enclosure further comprises a fourth opening for delivering a scanned document to a user.

32. The modular scanner of claim 31 further comprising a second paper pathway extending between said first opening and said fourth opening.

33. The modular scanner of claim 32 wherein a portion of said second paper pathway is common to said first paper pathway.

34. The modular scanner of claim 33 wherein said second paper pathway is configured to accept a document through said first opening in a face-up orientation and deliver said document after scanning through said fourth opening in a face-up orientation.

35. The modular scanner of claim 23 wherein said first enclosure further comprises a hatch configured to permit a user to clear a paper jam from said paper pathway.

36. A detachable platen element for a scanning system supporting platen and sheet fed scanning of documents comprising:
an enclosure having a substantially flat top surface with a glass plane attached thereon, said enclosure having one end with an opening therein for accepting a camera sub-assembly; and
translations means within said enclosure adapted for attaching to said camera sub-assembly and causing said camera sub-assembly to move in a direction permitting scanning of documents placed on said glass plane.

37. The platen element of claim 36 further comprising:
a lid with a substantially flat surface suitable for covering documents placed on said glass plane; and
hinging means coupling said lid to said enclosure.

38. The platen element of claim 36 wherein said translation means comprises a pulley and belt system adapted to engage a camera sub-assembly when placed in said enclosure for facilitating platen scanning of documents placed on said glass plane.

39. The platen element of claim 36 wherein said enclosure further comprises a rod configured to engage said camera sub-assembly for facilitating the movement of said camera sub-assembly within said enclosure.

* * * * *